(12) United States Patent
Scherling

(10) Patent No.: US 8,379,840 B2
(45) Date of Patent: Feb. 19, 2013

(54) PUSH-PUSH SLIDE MECHANISM

(75) Inventor: Herman Scherling, Kokkedal (DK)

(73) Assignee: Nokia Corporation, Espoo (FI)

(*) Notice: Subject to any disclaimer, the term of this patent is extended or adjusted under 35 U.S.C. 154(b) by 44 days.

(21) Appl. No.: 13/141,428

(22) PCT Filed: Dec. 18, 2009

(86) PCT No.: PCT/EP2009/067601
§ 371 (c)(1),
(2), (4) Date: Jul. 22, 2011

(87) PCT Pub. No.: WO2010/072693
PCT Pub. Date: Jul. 1, 2010

(65) Prior Publication Data
US 2011/0272307 A1 Nov. 10, 2011

(30) Foreign Application Priority Data
Dec. 23, 2008 (GB) .................................. 0823408.0

(51) Int. Cl.
*H04M 1/00* (2006.01)
*H04M 9/00* (2006.01)
(52) U.S. Cl. ................. 379/433.12; 455/575.4
(58) Field of Classification Search ............. 379/433.11, 379/433.12; 455/575.4; 361/679.39, 679.27, 361/679.13, 679.56; 16/258, 345, 362, 327, 16/271, 242
See application file for complete search history.

(56) References Cited

U.S. PATENT DOCUMENTS

| 6,064,734 A | 5/2000 | Hasegawa et al. ............ 379/433 |
| 2002/0132633 A1* | 9/2002 | Johnson et al. ............... 455/550 |
| 2003/0119350 A1 | 6/2003 | Chen .............................. 439/159 |
| 2006/0072285 A1 | 4/2006 | Liao et al. ...................... 361/679 |
| 2006/0176654 A1* | 8/2006 | Kfoury ......................... 361/681 |
| 2007/0249394 A1* | 10/2007 | Bong Doo .................. 455/556.1 |
| 2008/0207284 A1* | 8/2008 | Jung et al. .................. 455/575.4 |
| 2008/0280659 A1 | 11/2008 | Oh et al. ..................... 455/575.4 |

FOREIGN PATENT DOCUMENTS

WO WO 2008/080473 A1 7/2008

* cited by examiner

*Primary Examiner* — Tuan D Nguyen
(74) *Attorney, Agent, or Firm* — Harrington & Smith

(57) ABSTRACT

An apparatus including a guide track member for a first part, a guide pin for a second part and a first biaser. The first and second parts being for a portable electronic device and the guide track member including first and second guide track portions. The apparatus is configured such that the guide pm travels within the respective guide track first and second portions to provide respective first and second bistable configurations of the apparatus in which the first and second parts are held in relative positions to one another. The first biaser is configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration. The transition between the bistable configurations is provided by relative movement of the first and second parts in the same direction.

19 Claims, 7 Drawing Sheets

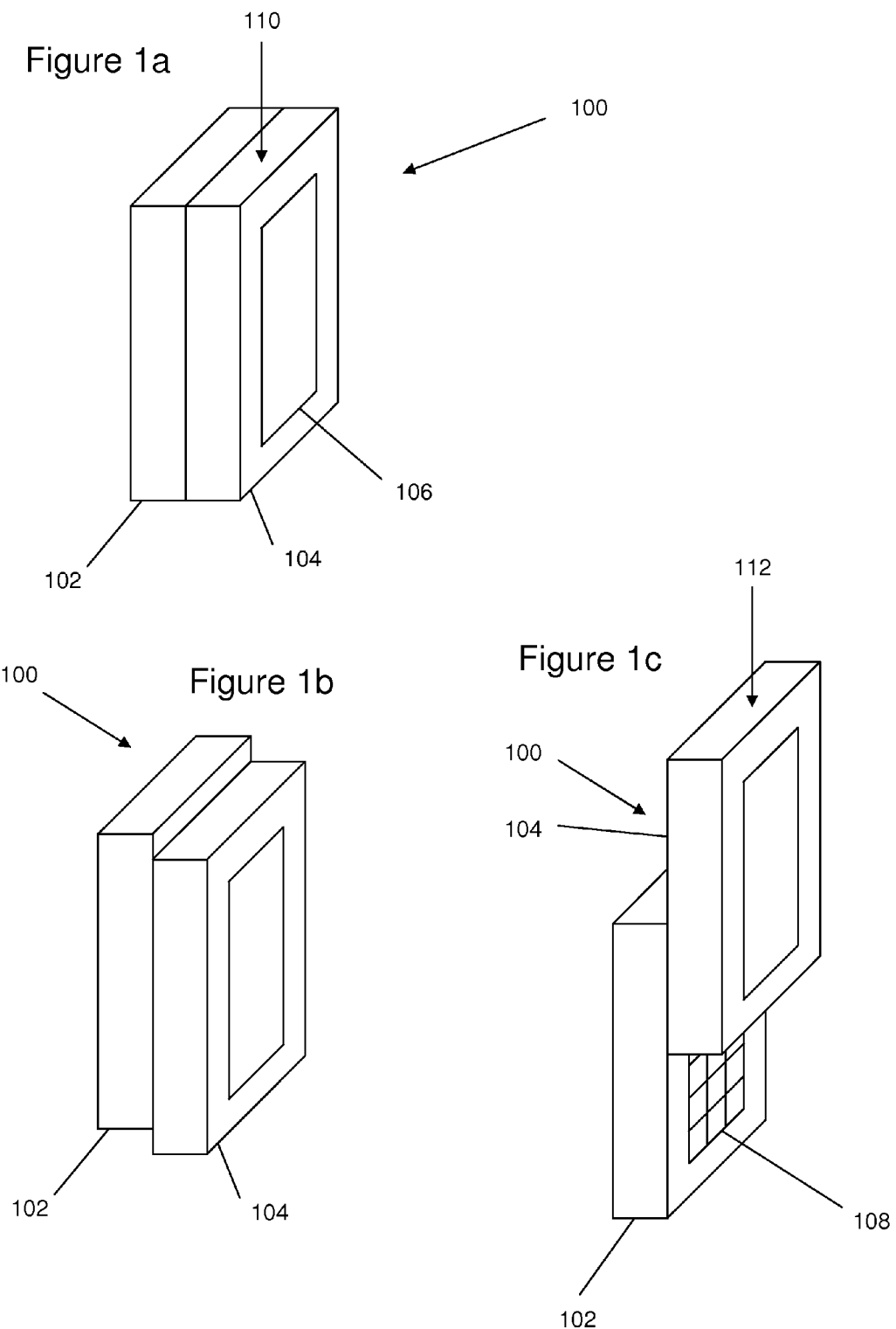

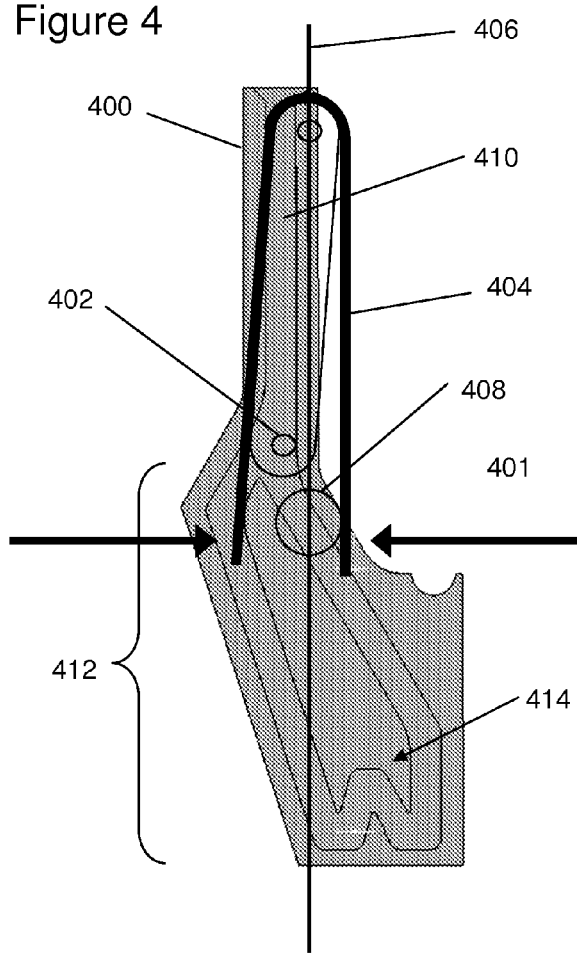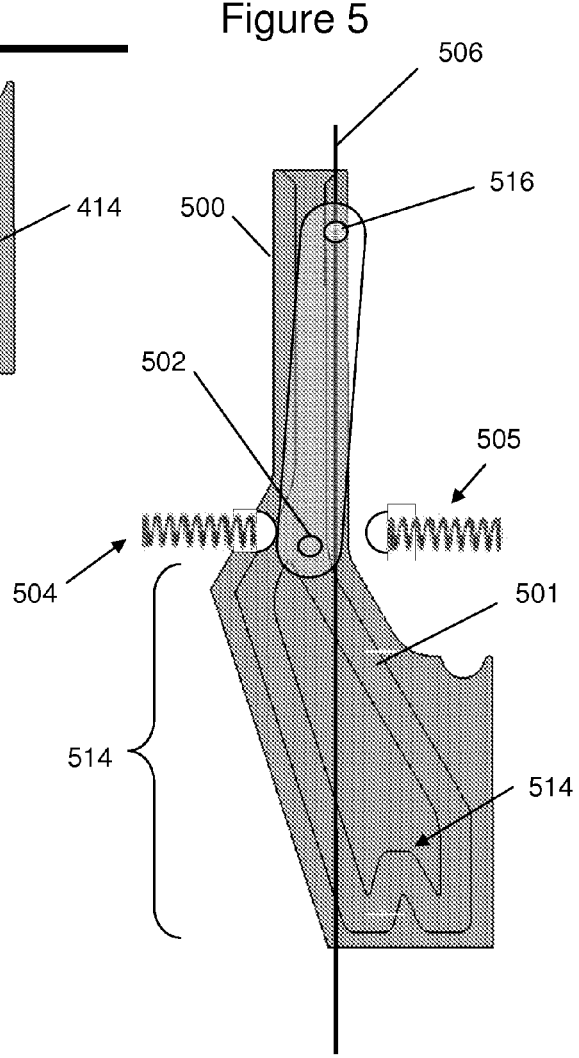

PUSH-PUSH SLIDE MECHANISM

TECHNICAL FIELD

The present disclosure relates to the field of apparatus configured to provide first and second bistable configurations, particularly push-push slide mechanisms, associated methods, and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Push-push mechanisms are characterised by being activated by applying a force in the same direction when opening or closing a device and by having two stable positions: open and closed. These two stable positions may be known as bistable positions/configurations.

Such mechanisms can be used in a number of applications, for example ball point pens, electrical switches, as opening/closing mechanisms for doors and furniture, push-push memory card readers and mobile telephones.

WO 2008/080473 (Amphenol-Tuchel Electronics GmbH) discloses a push-push mechanism, particularly control cam for a push-push chip card reader. A control cam has a closed shape forming a central part in a component, for example a contact support, and is provided with steps, especially in the area of the locked position. The central part has a reduced height such that the control pin has a low height and the push mechanism thus has a low total height.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising a guide track member for a first part, a guide pin for a second part and a first biaser, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the first biaser configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration, and wherein transition between the bistable configurations is provided by relative movement of the first and second parts in the same direction.

Using a first biaser that applies a lateral force to control the movement of the guide pin can enable the apparatus to be kept relatively thin as the moving parts move in a plane that need not involve movement through the depth of the apparatus, which may be referred to as the Z direction.

The first biaser may comprise one or more biasers that are configured to apply the lateral forces. For example, in some embodiments, separate biasers may be used to apply the lateral forces to the guide pin to cause it to travel down the first and second portions of the guide track.

The guide track may comprise a loop portion consisting of the first portion of the guide track and the second portion of the guide track. A loop can be a convenient way to allow the guide pin to repeatedly travel around the first and second portions of the guide track as the portable electronic device moves between the first and second bistable configurations.

The guide track may comprise a first retaining portion and a second retaining portion for retaining the guide pin when it is in the first and second bistable configurations respectively.

The first retaining portion of the guide track may be laterally offset from the second retaining portion of the guide track, and the first biaser may be configured to apply a lateral force to the guide pin so that it tends to a position that is laterally between the first and second retaining portions. Having the first biaser arranged to apply a lateral force to the guide pin so that it tends to a position that is laterally between the first and second retaining portions can enable the guide pin to initially move in the direction of the second retaining portion when it is released from the first retaining portion, and vice versa.

The first retaining portion may be an elongate portion linked to the loop portion between a first end of the first portion of the guide track and a first end of the second portion of the guide track in order to retain the guide pin when the apparatus is in the second configuration. In some embodiments the second retaining portion may be the elongate portion. The elongate portion may provide a region of the guide track that allows for the majority of the relative movement between the first and second parts of the device as the device moves between the first and second bistable configurations.

The first biaser may be configured to cause the guide pin to tend to a position that is off-centre in relation to the elongate portion of the guide track, and this can causes the guide pin to travel along a certain side of the loop portion when travelling from the elongate portion to the loop portion of the guide track.

The second retaining portion may be a notch portion between a second end of the first portion of the guide track and a second end of the second portion of the guide track in order to retain the guide pin when the apparatus is in the first configuration.

The notch portion may be any shape of the guide track that can retain the guide pin when no external force is applied to one of the parts of the device. The notch portion may be an angular or V-shaped indentation in the loop. The notch portion may be an irregularity in the shape of the loop that prevents the guide pin from moving further around the loop until an external user force is applied.

The first biaser may be configured to cause the guide pin to tend to a position that is off-centre in relation to the notch portion of the guide track, and this can cause the guide pin to travel along the other side of the loop portion when travelling from the notch portion to the loop portion of the guide track.

The loop portion can be asymmetrical. This can reduce wear and tear of the guide pin and/or guide track member as the asymmetric loop can enable the guide pin to move around the loop without being overly forced against a side of the guide track. In addition, the asymmetric shape of the loop can, in conjunction with the first biaser, cause the guide pin to travel down different sides of the loop, and this can be particularly advantageous if the guide pin is moving quickly relative to the guide track where there may be a delay before the lateral force applied by the first biaser takes effect.

The first biaser and the shape of the guide track may be configured to cause the guide pin to travel along the first portion of the loop portion from the notch portion to the elongate portion when the device is changed from the first configuration to the second configuration, and the first biaser and the shape of the guide track may be configured to cause the guide pin to travel along the second part of the loop portion from the elongate portion to the notch portion when the device is changed from the second configuration to the first configuration.

The guide pin may be configured to travel along the guide track in a single plane. The single plane may be in the X-Y plane of the apparatus, that is the guide pin may not move in a plane that includes the depth of the apparatus. Having the guide pin move in a single plane can enable a thin apparatus/mechanism/device to be achieved and can reduce the mechanical wear of one or more of the moving parts as the guide pin only moves in a single plane.

The guide track and guide pin may comprise a push-push mechanism. The guide track may be considered as having a cam profile.

The floor of the guide track may be flat, or may be substantially flat. There may be no steps in the floor of the guide track.

The guide pin may be pivotally mountable to the second part, and this may enable lateral movement of the guide pin relative to the guide track member as it travels around the guide track. In other embodiments, the guide track member may be pivotally mounted to the first part of the device, in order to enable the lateral movement of the guide track member relative to the guide pin, as the guide pin travels around the guide track.

The first bistable configuration may be a closed configuration. The second bistable configuration may be an open configuration.

The apparatus may further comprise a second biaser configured to bias the first and second parts towards the second bistable configuration. The second biaser can cause the device to automatically tend towards its second bistable configuration when it is released from the first bistable configuration.

The second biaser may be configured to cause the guide pin to be retained in the notch portion of the loop portion of the guide track when the device is in the first configuration. The second biaser may be configured to cause the guide pin to be retained in the elongate portion of the guide track when the device is in the second configuration.

In other embodiments, the second biaser may not be required as the internal force that is applied by the second biaser can be provided as an external, user applied force.

According to a further aspect, there is provided a device comprising an apparatus, the apparatus comprising a guide track member for a first part, a guide pin for a second part and a first biaser, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the first biaser configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration, and wherein transition between the bistable configurations is provided by relative movement of the first and second parts in the same direction.

According to a further aspect, there is provided a module for a device, the module comprising an apparatus, the apparatus comprising a guide track member for a first part, a guide pin for a second part and a first biaser, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the first biaser configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration, and wherein transition between the bistable configurations is provided by relative movement of the first and second parts in the same direction.

The device may be an electronic device configured for communications, for example mobile telephony.

According to a further aspect, there is provided a method of operating an apparatus, the apparatus comprising a guide track member for a first part, a guide pin for a second part, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the method comprising:

applying a lateral force to the guide pin to cause it to travel along the first portion of the guide track when moving from the first bistable configuration to the second bistable configuration; and applying a lateral force to the guide pin to cause it to travel along the second portion of the guide track when moving from the second bistable configuration to the first bistable configuration, wherein transition between the bistable configurations is provided by relative movement of the first and second parts in the same direction.

According to a further aspect, there is provided a method of assembling an apparatus, the apparatus comprising a guide track member for a first part, a guide pin for a second part and a first biaser, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the first biaser configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration, and wherein transition between the bistable configurations is provided by relative movement of the first and second parts in the same direction.

According to a further aspect, there is provided a method of assembling a device, the device comprising an apparatus, the apparatus comprising a guide track member for a first part, a guide pin for a second part and a first biaser, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the first biaser configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration, and wherein transition between the bistable configurations is provided by relative movement of the first and second parts in the same direction.

According to a further aspect, there is provided apparatus comprising a means for providing a guide track for a first part, a guide pin for a second part and a first means for biasing, the first and second parts being for a portable electronic device and the means for providing a guide track comprising first and second guide track portions, the apparatus configured such that the guide pin travels within the respective guide track first and second portions to provide respective first and second bistable configurations of the apparatus in which the first and second parts are held in relative positions to one another, the first means for biasing configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration, and wherein transition between the bistable configurations is provided by relative movement of the first and second parts in the same direction.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 1 illustrates schematically different configurations of a mobile telephone having a push-push mechanism according to an embodiment of the invention;

FIG. 4 illustrates a guide track member and guide pin according to an embodiment of the invention;

FIG. 5 illustrates another guide track member and guide pin according to an embodiment of the invention;

DESCRIPTION OF SPECIFIC ASPECTS/EMBODIMENTS

Figure 2A:
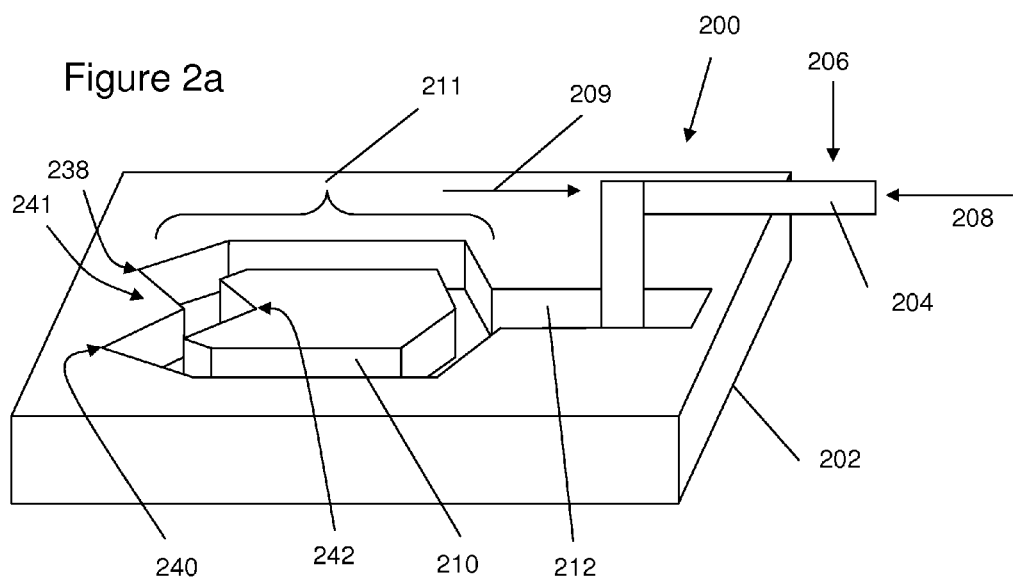
FIG. 2 illustrates schematically a prior art guide track and guide pin.

One or more embodiments described herein relate to a push-push mechanism comprising a guide track member for a first part of an electronic device and a guide pin for a second part of the device. The guide pin is configured to travel along the guide track when the device changes between first and second bistable configurations. The guide track may have a loop portion, and the mechanism may also comprise a biaser that applies a lateral force to the guide pin such that it passes along the guide track in a predetermined route when travelling from the first bistable position to the second bistable position, and along a different predefined route when travelling back from the second bistable position to the first bistable position.

Using a biaser that applies a lateral force to the guide pin can enable a thin push-push mechanism to be provided as there is no requirement for the guide pin to move in the Z direction (that is, through the depth of the mechanism), and it may be that one or more steps in the floor of the guide track are not required to ensure that the guide pin takes the correct route along the guide track. The reduction or removal of steps may enable a thinner guide track member to be achieved and/or a shorter guide pin to be required.

FIG. 1 illustrates a device having a push-push mechanism according to an embodiment of the invention. In this example, the device is a mobile telephone 100 having a first part 102 and a second part 104. The second part 104 has a display screen 106.

In use, when the device 100 is in the closed, first bistable configuration as shown in FIG. 1*a*, a longitudinal force 110 can be applied to the second part 104 in order to displace it relative to the first part 102 to open the device 100. The second part 104 can move only a short distance relative to the first part 102 to the position shown in FIG. 1*b*, and this small displacement is used to release the push-push mechanism (not shown) such that an internal spring (not shown) can force the second part 104 in a longitudinal direction that is opposite to the applied force 110 when the user applied force 110 is released. In this way, the device changes to the second, open bistable configuration as shown in FIG. 1*c*.

In this example, when the device 100 is in the open bistable configuration, a keypad 108 is exposed on the first part 102 from beneath the second part 104.

In order for a user to change the configuration of the device 100 from the open bistable configuration illustrated in FIG. 1c back to the closed bistable configuration illustrated in FIG. 1a, that is to close the device 100, they can apply a force 112 to the second part 104 of the device 100 in the same longitudinal direction as the force 110 that was used to open the device 100. This type of mechanism is called a push-push mechanism because a longitudinal "push" force is applied in the same direction to both open and close the device associated with the mechanism.

Figure 2B:
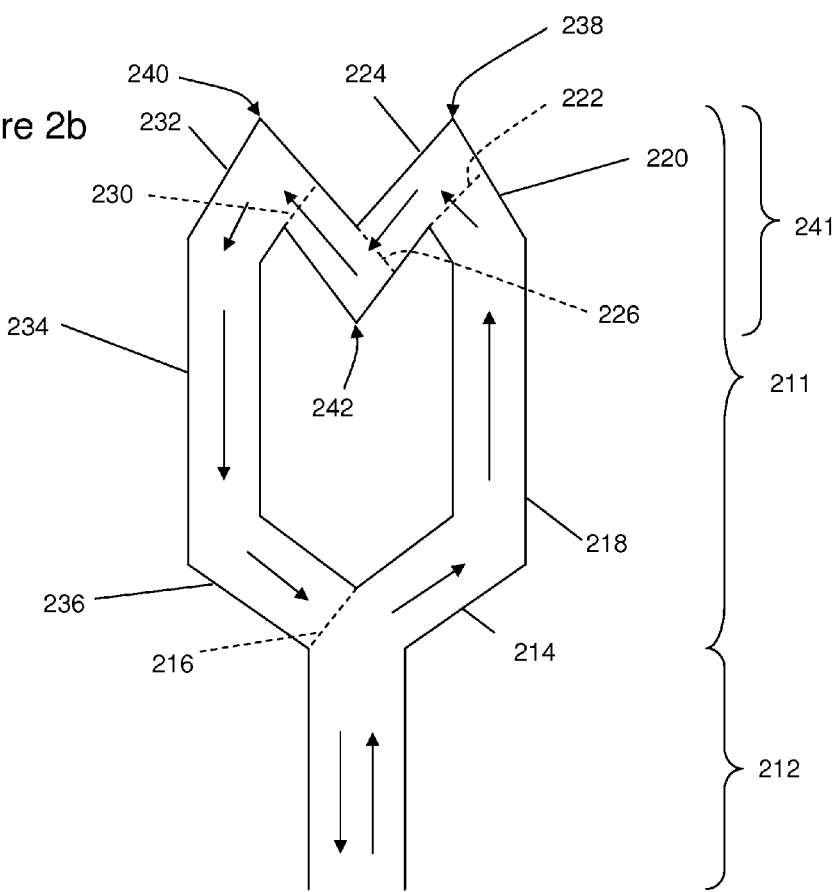

FIG. 2 illustrates a prior art push-push mechanism 200 having a guide pin 204 and a guide track member 202 having a guide track 210. In this prior art example, the guide track 210 has a number of steps 216, 222, 226, 230 (as shown in FIG. 2b) in order to ensure that the guide pin 204 travels the correct way around a loop portion of the guide track 210. It will be understood that in between at least some of the downhill steps in the loop are uphill slopes so that the floor of the loop can be formed as a continuous surface.

An internal force 206 is applied by a spring (not shown) to the top of the guide pin 204 to ensure that a bottom surface of the guide pin 204 stays in contact with the floor of the guide track 210. In this way, the guide pin 204 is prevented from moving up steps which it encounters when moving along the guide track 210, but can move up gradual slopes that are provided between the steps in an intended direction of travel of the guide pin 204 along the guide track 210. It will be appreciated that the steps and slopes are used to control which way the guide pin 204 can and cannot move along the track 210.

In addition, a further internal force 209, this time in the longitudinal direction is applied to the guide pin 204 to push the guide pin towards the distal end of the elongate portion 212. The internal longitudinal force 209 is in the opposite direction to a user applied force 208 to open or close the mechanism. The internal longitudinal force 209 is used to automatically slide the two parts of a device fitted with the mechanism to an open configuration when the device is released from the closed configuration, and maintains the device in the closed configuration when no user applied force 208 is present.

When a user wishes to change the configuration of the mechanism, they apply an external user force 208 that is greater than the internal longitudinal force 209 to move the guide pin 204 along the guide track 210. When the external user force 208 is removed, the internal spring force 209 keeps the mechanism in either of the open or closed bistable configurations.

The guide track 210 comprises a notch portion 241 at the end of the loop 211 that is opposite the longitudinal portion 212, and comprises two external apexes/corners 238, 240. These apexes may be considered as external apexes as they face out from the loop 211. The two apexes 238, 240 of the guide track 210 are configured to accommodate the guide pin 204 when a "push" force has been applied to the guide pin 204 to change the bistable configuration of the mechanism. That is, the guide pin 204 is located in the first apex 238 when a force has been applied by a user to close the mechanism, and the guide pin 204 is located in the second apex 240 when a user has applied a push force to open the mechanism.

In between the first and second external apexes 238, 240 is a third internal apex 242 that faces in the opposite direction to the first and second apexes 238, 240. The third apex 242 may be considered as an internal apex as it faces in towards the middle of the loop 211. The third apex 242 retains the guide pin when the mechanism is in the closed position and the user applied external force 208 has been removed. The internal longitudinal spring force 209 prevents the guide pin from moving out of the third apex 242.

A plan view of the guide track 210 is illustrated in detail in FIG. 2b. The guide track 210 comprises a loop portion 211 and an elongate portion 212. The elongate portion 212 feeds into one end of the loop portion 211, and the loop portion 211 has a notch portion 241 at its opposite end. The notch portion 241 is configured to retain the guide pin when the mechanism is in the first bistable, closed configuration, and the elongate portion 212 of the guide track 210 is configured to retain the guide pin when the mechanism is in the second bistable, open configuration.

When the mechanism 200 is in an open configuration the guide pin is located at a distal end of the elongate portion 212. When a user wants to change the configuration of the mechanism 200 from an open bistable configuration to a closed bistable configuration a force 208 is indirectly applied to the guide pin 204 to move it along the elongate portion 212 of the guide track and into the loop portion 211 of the guide track 210. The force may be indirectly applied to the guide pin 204 by a user sliding a part to which the guide pin 204 is attached. Such mechanisms may be known for use with card readers.

As the guide pin 204 enters the loop portion 211 of the guide track 210 it could potentially move down either of the two sides of the loop 211. However, according to the prior art a vertical face of an uphill step 216 across one side of the loop 211 prevents the guide pin 204 from travelling down that side of the loop 211. As the force 208 is continued to be applied to the guide pin 204, it moves around the other side of the loop, which in FIG. 2b comprises loop portions 214, 218, 220, towards the first apex 238 of the notch portion 241.

As the guide pin 204 enters the first apex 238, it goes over a downhill step 222 to prevent it from travelling back down the first side of the loop portion 211, the first side of the loop portion consists of portions 214, 218, 220. The step 222 ensures that when the user applied force 208 to the guide pin 204 is released, the guide pin 204 moves into the internal third apex 242 of the notch portion 241.

Again, as the guide pin 204 enters the third apex 242, it goes down another downhill step 226 that prevents the guide pin 204 from moving back directly to the first apex 238 when the user force is applied (or increased again).

While the user force 208 that is applied to the guide pin when it is the third apex 242 is less than the longitudinal internal force 209, the mechanism is held in the closed configuration, such as that illustrated in FIG. 1a, by internal longitudinal force 209.

When a user force 208 is applied to the guide pin 204, it causes the guide pin 204 to leave the third apex 242 in the notch portion 241, go down another step 230, and be accommodated in the second apex 240. At this point, the removal of the user force 208 causes the internal spring force 209 to move the guide pin 204 along the second side of the loop portion defined by guide track portions 232, 234, 236 until it gets to a downhill step 216 and then passes along the elongate portion 212 until it reaches its fully open configuration (as shown in FIG. 1c).

It will be appreciated that the step 216 is a downhill step when the guide pin 204 is travelling in this direction, and permits the guide pin to pass when it is travelling from the second side of the loop 211 to the elongate portion 212. The same step 216 is an uphill step that prevents the guide pin from travelling down the second side of the loop when the guide pin 204 is travelling down the elongate portion 212 towards the loop portion 211.

It will be appreciated that the steps that are used to ensure that the guide pin 204 moves in the correct direction along the guide track 210 require a certain depth of the guide track 210 in order to accommodate the steps, and also that the portion of the guide pin 204 that enters the guide track 210 must be of a minimum length such that it can go down the steps, and up the slopes between the steps.

Embodiments of the invention described herein provide a push-push mechanism that control the movement of the guide pin around the guide track using a biaser that applies a lateral force to the guide pin, and therefore can provide a push-push mechanism with a reduced thickness. Some embodiments may not require steps and slopes to control the movement of the guide pin.

Figure 3A:
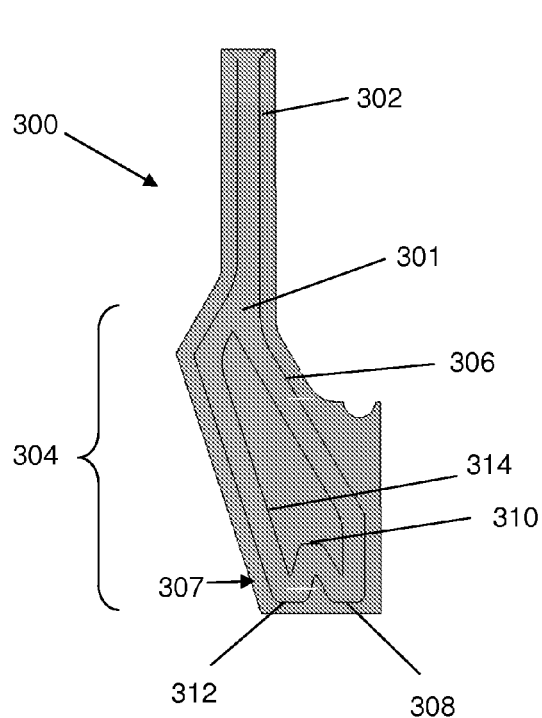
FIG. 3 illustrates a guide track member according to an embodiment of the present invention.
Figure 3B:
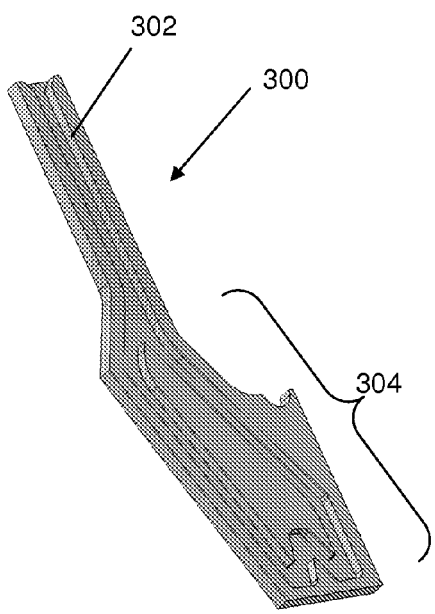

FIG. 3a illustrates a plan view of a guide track member 300 according to an embodiment of the invention and FIG. 3b shows a perspective view of the same guide track member 300. The guide track member 300 has a guide track 301 engraved therein. The guide track 301 is a channel along which a guide pin (not shown) can travel. The guide track 301 comprises an elongate portion 302 and a loop portion 304. The elongate portion 302 is a straight channel along which the guide pin can move as an associated device changes between two bistable configurations.

The loop portion 304 is shaped such that a lateral force (described below) that is applied to the guide pin as it moves between the bistable configurations causes the guide pin to travel down a first side 306 of the loop 304 when changing from the first to the second bistable configuration, and along the other side 314 of the loop 304 when the device changes from the second to the first configuration. The guide pin is retained in a notch portion 307 or the elongate portion 302 to hold a device in the two bistable configurations.

It will be appreciated that one or more of the features of the guide track, and particularly the loop portion of the guide track, that are described in relation to the prior art mechanism illustrated in FIG. 2 may be used with one or more embodiments of the invention.

The first side/portion 306 of the loop 304 is configured such that the guide pin travels along the first portion 306 to the notch 307 when the device changes from the open, second bistable configuration to the closed, first bistable configuration. The notch 307, consists of two apexes 308, 312 facing outwards and an apex 310 that faces inwards into the loop 304, that are configured to retain the guide pin in a similar way to the mechanism described in FIG. 2.

When a second push force is applied to the guide pin, the shape of the loop portion 304 causes the guide pin to travel along the other side/portion 314 of the loop 304 and back to the elongate portion 302, whereby the device is retained in the open configuration.

The notch portion 307 and the elongate portion 302 may be considered as retaining portions of the guide track, as they each retain the guide pin in one of the bistable configurations of the mechanism.

FIG. 4 illustrates a guide track member 400 and a guide pin 402 according to an embodiment of the invention. A U shaped spring 404 is coupled to the guide pin 402 to bias the guide pin to a central (neutral) line 406. The neutral line 406 is provided by a stop 408 for the spring 404, wherein the stop 408 lies on the neutral line 406, such that the U shaped spring 404 applies a force to the pin 402 back towards the neutral line 406 when it is laterally displaced with regard to the stop 408. The spring 404 may be considered as a biaser that applies an internal lateral force to the pin to cause it to travel in a predefined route around the guide track 401 as the pin is moved in a longitudinal direction relative to the guide track 401.

In some embodiments, an inside surface of the guide track 401, that is a side surface along which the guide pin travels as it is biased by the U shaped spring 404, may be provided with rounded corners in order to reduce the mechanical wear of the pin 402 and the guide track 401.

In some embodiments, there may be provided a further internal longitudinal force, for example by a spring, that biases the guide pin 402 towards the distal end of the elongate portion 410 of the guide track 401. In this way, the mechanism may automatically tend towards its open configuration when the pin is released from the notch portion 414 of the loop 412 in the guide track 401.

However, it will be appreciated that an internal longitudinal force is not essential to the operation of the invention, as the longitudinal force could be applied externally by a user to change the configuration of the mechanism to an open configuration. That is, the user could apply both "push" and "pull" movements to open and close the mechanism.

It will be appreciated that the pin 402, spring 404 and stop 408 are all coupled to the same part of an electronic device such that they move together relative to the guide track member 400.

FIG. 5 illustrates an alternative embodiment of a guide track member 500 and pin 502 according to the invention. In this embodiment, the biaser is provided by two springs 504, 505 that each applies a lateral force to the pin 502 when the pin 502 strays from either side of the central/neutral line 506.

It will be appreciated that any biaser can be used that applies a force to the pin 502 such that it tends towards the desired neutral position.

In this embodiment, the geometry of the guide track 501 requires a neutral line 506 that is between the elongate portion 510 and the notch portion 514 of the guide track 501, such that the guide pin 502 is moved towards the other retaining portion (elongate portion, notch portion) 510, 514 when it is released from one of the retaining portions.

It will be appreciated that the guide track member 500 is associated with a first part of a slidable device, and the guide pin 502 is associated with a second part of the slidable device. In this embodiment, the guide track member 500 is attached to the first part such that it does not move relative to the first part in use. The guide pin 502 is pivotally attached to the second part about pivot point 516 such that lateral movement of the guide pin 502 can be provided relative to the second part to which it is pivotally attached. This can ensure that the guide pin 502 is also laterally moveable relative to the guide track member 500 so that it can travel along the loop portion 512 of the guide track 501.

FIG. 6 illustrates the push-push mechanism of FIG. 4 in use in a device in a closed configuration. The closed configuration may be the first bistable configuration.

Figure 6A:
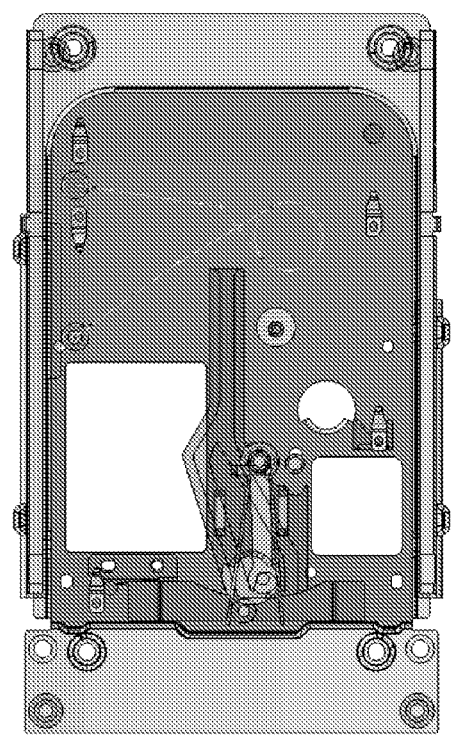
FIG. 6 illustrates a mechanism according to an embodiment of the invention in use in a device in a closed configuration.
Figure 6B:
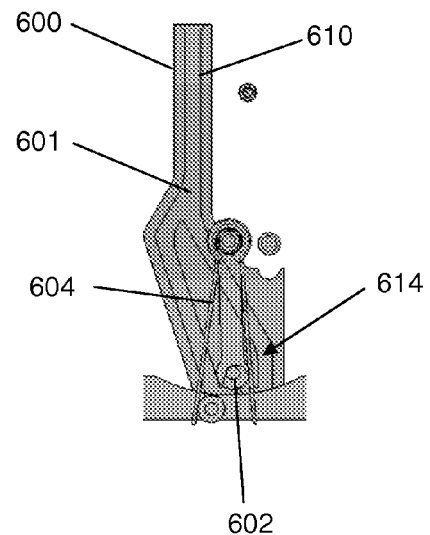
Figure 6C:
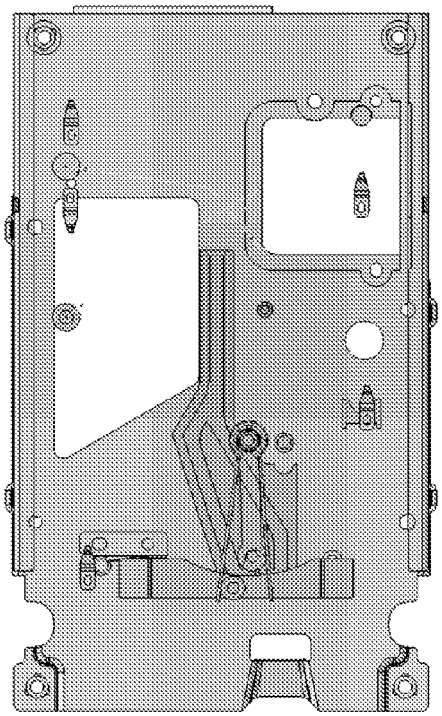

FIG. 6a illustrates the guide track member 600, guide pin 602 and biaser 604 in isolation. FIGS. 6b and 6c illustrate a front and back view of a device fitted with the mechanism in a closed configuration.

In the closed configuration illustrated in FIG. 6, the guide pin 602 is retained in the notch portion 614 of the guide track 601. In this embodiment, an internal bias force is applied by a spring (not shown) in a longitudinal direction towards the elongate portion 610 of the guide track member 600. The longitudinal internal force retains the mechanism in the closed configuration and prevents the guide pin 602 from leaving the notch portion 614.

Figure 7:
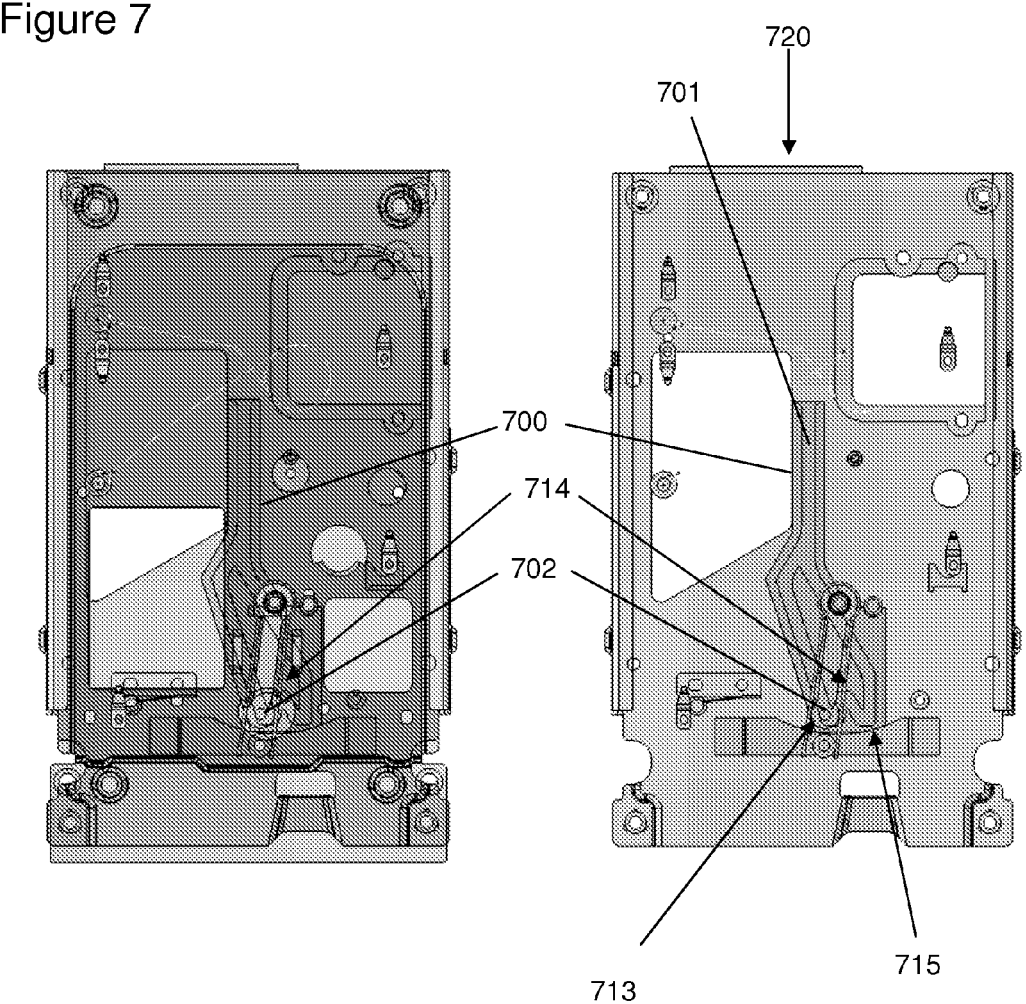
FIG. 7 illustrates the mechanism of FIG. 6 in use in a device in a "press down before release" configuration.

FIG. 7 illustrates a front and back view of the device of FIG. 6 with the mechanism in a "pressed down before release" configuration. This configuration is neither of the first or second bistable configurations, as it can only be maintained through application of an external user force. The external user force 720 is illustrated in FIG. 7 as being applied to one of the two parts of the device such that the guide pin 702 moves out of the notch portion 714 of the guide track 701 and into a first apex 713 defined to one side of the notch portion 714.

As best illustrated in FIG. 6a, the biaser 604 applies a lateral force to the guide pin 602 such that when the user force 720 is applied in FIG. 7, the pin travels down a first side of the notch 714 to the first apex 713. The lateral force applied by the biaser 704 prevents the guide pin 702 from travelling down a second side of the notch 714 to a second apex 715 of the guide track 701.

Figure 8:
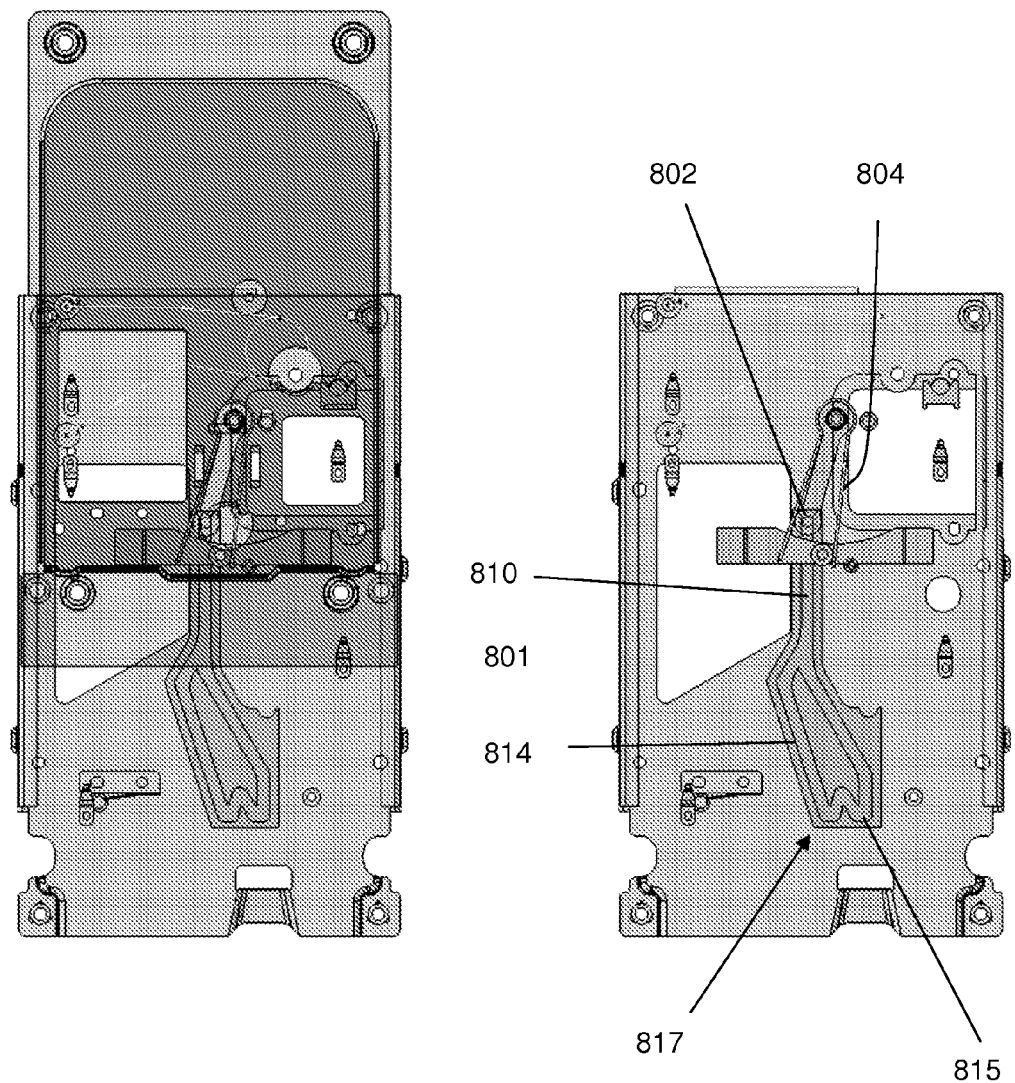
FIG. 8 illustrates the mechanism of FIG. 6 in use in a device in an open configuration.

When the user applied force 720 is removed, the internal longitudinal force causes the device to change to a second, open bistable configuration as illustrated in FIG. 8.

FIG. 8 illustrates the device of FIGS. 6 and 7 in a fully open configuration whereby the pin 802 has travelled to a distal end of the elongate portion 810 under the internal force of the longitudinal spring (not shown). There may be provided a stop at the end of the elongate portion 810 of the guide track 801 to define an end point of the longitudinal movement of the two parts.

In order for a user to change the configuration of the device from the closed, second bistable configuration (FIG. 8) to the open, first bistable configuration (FIG. 6) they can apply an external force, in the same direction as the force 720 illustrated in FIG. 7, to the device. The application of the external force causes the guide pin 802 to travel down the elongate portion 810 of the guide track 801. Due to the force applied by the U shaped spring 804 and also the asymmetrical geometry of the loop 814, the guide pin 802 travels back down the opposite side of the loop 804 to the side that the guide pin travelled along when changing from the first to the second bistable configurations.

When the guide pin 802 is in the second apex 815, the device appears from the outside to be in the same configuration as that shown in FIG. 7. However, as the guide pin 802 is in the second apex 815 as opposed to the first apex 813 as shown in FIG. 7, release of the user-applied external force causes the guide pin 802 to move into the notch 817, and thereby assume the same position as that illustrated in FIG. 6.

It will be appreciated that this type of mechanism is known as a push-push mechanism because the external user applied force is applied in the same direction to both open and close the device.

FIG. 9 illustrates a comparison of the achievable depths of mechanisms according to the prior art and an embodiment of the present invention.

Figure 9A:
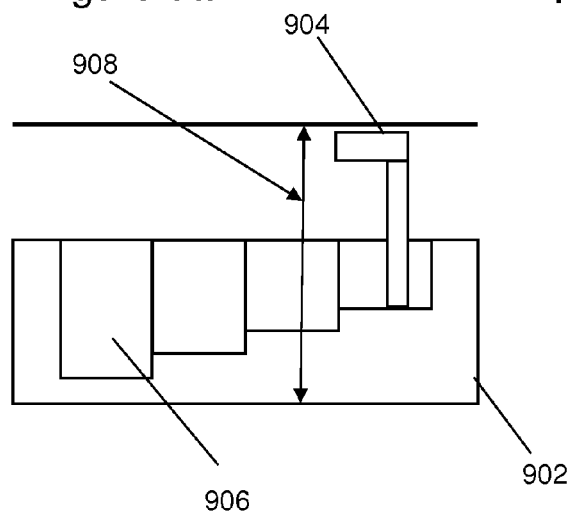
FIG. 9 illustrates schematically a comparison between the total height of a prior art mechanism and a mechanism according to an embodiment of the invention.

FIG. 9a shows a cutaway view of the guide track channel 906 of the prior art. The guide channel 906 has a number of steps and is configured to accommodate a moving pin 904 in use. The total height of the mechanism 908 is defined by the maximum height of the pin 904 relative to the guide track member 902 when the pin 904 is in its highest possible position. In this prior art example, the highest height of the pin is when it is located on its highest step. In addition, the pin 904 has to be of a minimum length that it can reach the deepest/lowest step.

Figure 9B:
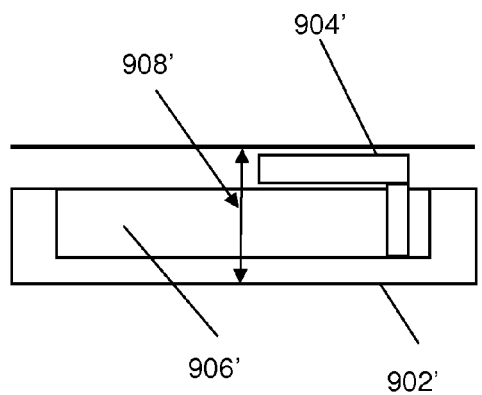

In contrast, FIG. 9b shows a cutaway view of a guide channel 906' according to an embodiment of the invention. In this embodiment, the total height of the mechanism is much less than the height of the prior art mechanism shown in FIG. 9a. This is because the guide track member 902' can be shallower as it does not need to accommodate one or more steps, and also the guide pin 904' can be shorter as it does not need to reach to the bottom of a deepest step.

In addition, some embodiments of the invention can provide a push-push mechanism that is mechanically less susceptible to wear and damage as it does not need to traverse one or more steps in use, as it does with the prior art.

In some embodiments, the guide pin can be made wide in an X-Y plane, and this can provide robust mechanism/apparatus whilst not requiring an increase in the thickness of the mechanism. In addition, the pin can be made short which can also improve robustness.

Figure 10:
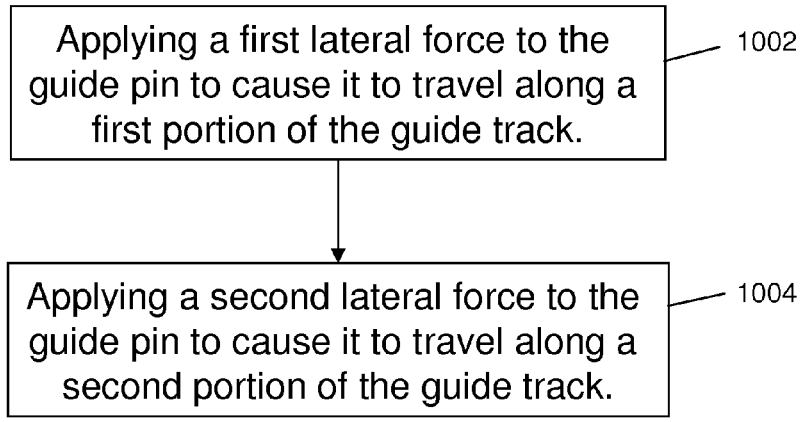
FIG. 10 illustrates schematically a method according to an embodiment of the invention.

FIG. 10 illustrates schematically a method of operating an apparatus according to an embodiment of the invention. The apparatus may be any apparatus/mechanism described herein.

At step 1002, the method comprises applying a first lateral force to a guide pin to cause it to travel along a first portion of a guide track when moving from the first bistable configuration to the second bistable configuration.

Once the apparatus has reached the second bistable configuration, and no external user force is applied to change the configuration of the apparatus, the apparatus is retained in the second bistable configuration until a further user force is applied to change the configuration of the apparatus back to the first configuration.

When the further user force is received, the method moves on to step 1004, which comprises applying a second lateral force to the guide pin to cause it to travel along a second portion of the guide track when moving from the second bistable configuration to the first bistable configuration.

The apparatus may be moving from the first bistable configuration to the second bistable configuration or from the second bistable configuration to the first bistable configuration, as the first and second lateral forces are applied at steps 1002 and 1004 in accordance with a force applied by a user, or may be moving in accordance with a force applied by a biaser that is associated with the apparatus.

In some embodiments, transition between the bistable configurations may be provided by relative movement of first and second parts associated with the apparatus in the same direction.

Embodiments described herein can provide a push-push slide mechanism which is so thin—while still robust—that it can be fit into conventional slide mechanisms for devices such as mobile phones, card readers, universal serial bus (USB) keys, other simple electronic devices, and other thin push-push mechanisms, for example for kitchen doors. Prior art push-push mechanisms can be known to become bulky when they are made to control something as large as the sliding of the two halves of a slide phone.

Prior art mechanisms that require movement in several steps and thus several planes in order to obtain a bi-stable push-push function can provide a mechanism that is too thick.

It will be appreciated to the skilled reader that the apparatus/device/server and/or other features of particular apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor and/or on one or more memories/processors.

It will be appreciated that the aforementioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

With reference to any discussion of processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a guide track member for a first part, a guide pin for a second part and a first biaser, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the first biaser configured to apply a lateral force to the guide pin to cause it to travel along the first portion of the guide track when moving from the first bistable configuration to the second bistable configuration and to apply a lateral force to the guide pin to cause it to travel along the second portion of the guide track when moving from the second bistable configuration to the first bistable configuration, and wherein transition between the bistable configurations is provided by relative movement of the first and second parts in the same direction.

2. The apparatus of claim 1, wherein the guide track comprises a loop portion consisting of the first portion of the guide track and the second portion of the guide track.

3. The apparatus of claim 1, wherein the guide track comprises a first retaining portion and a second retaining portion for retaining the guide pin when it is in the first and second bistable configurations respectively.

4. The apparatus of claim 3, wherein the first retaining portion of the guide track is laterally offset from the second retaining portion of the guide track, and wherein the first biaser is configured to apply a lateral force to the guide pin so that it tends to a position that is laterally between the first and second retaining portions.

5. The apparatus of claim 3, wherein the guide track comprises a loop portion consisting of the first portion of the guide track and the second portion of the guide track, and wherein the first retaining portion is an elongate portion linked to the loop portion between a first end of the first portion of the guide track and a first end of the second portion of the guide track in order to retain the guide pin when the apparatus is in the second configuration.

6. The apparatus of claim 5, wherein the first biaser is configured to cause the guide pin to tend to a position that is off-centre in relation to the elongate portion of the guide track.

7. The apparatus of claim 3, wherein the guide track comprises a loop portion consisting of the first portion of the guide track and the second portion of the guide track, and wherein the second retaining portion is a notch portion between a second end of the first portion of the guide track and a second end of the second portion of the guide track in order to retain the guide pin when the apparatus is in the first configuration.

8. The apparatus of claim 7, wherein the first biaser is configured to cause the guide pin to tend to a position that is off-centre in relation to the notch portion of the guide track.

9. The apparatus of claim 2, wherein the loop portion is asymmetrical.

10. The apparatus of claim 5, wherein the first biaser and the shape of the guide track are configured to cause the guide pin to travel along the first portion of the loop portion from the notch portion to the elongate portion when the device is changed from the first configuration to the second configuration, and wherein the first biaser and the shape of the guide track are configured to cause the guide pin to travel along the second part of the loop portion from the elongate portion to the notch portion when the device is changed from the second configuration to the first configuration.

11. The apparatus of claim 1, wherein the guide pin is configured to travel along the guide track in a single plane.

12. The apparatus of claim 1, wherein the guide track and guide pin comprise a push-push mechanism.

13. The apparatus of claim 1, further comprising a second biaser configured to bias the first and second parts towards the second bistable configuration.

14. A device comprising the apparatus of claim 1.

15. The device of claim 14, wherein the device is configured for mobile telephony.

16. A module for a device, the module comprising the apparatus of claim 1.

17. A method of operating an apparatus, the apparatus comprising a guide track member for a first part, a guide pin for a second part, the first and second parts being for a portable electronic device and the guide track member comprising first and second guide track portions, the apparatus configured such that the guide pin travels within the respective guide track first and second portions to provide respective first and second bistable configurations of the apparatus in which the first and second parts are held in relative positions to one another, the method comprising:

applying a lateral force to the guide pin to cause it to travel along the first portion of the guide track when moving from the first bistable configuration to the second bistable configuration; and applying a lateral force to the guide pin to cause it to travel along the second portion of the guide track when moving from the second bistable configuration to the first bistable configuration, wherein transition between the bistable configurations is provided by relative movement of the first and second parts in the same direction.

18. A method of assembling an apparatus according to claim 1.

19. A method of assembling a device according to claim 14.

* * * * *